United States Patent Office 3,342,847
Patented Sept. 19, 1967

3,342,847
PREPARATION OF UNSATURATED NITRILES
Jurgen Max Kruse, Pitman, N.J., assignor to E. I. du Pont de Nemours and Company, Wilmington, Del., a corporation of Delaware
No Drawing. Filed June 14, 1965, Ser. No. 463,883
13 Claims. (Cl. 260—465.3)

The present invention relates to a process for preparing nitriles.

U.S. Patent 2,736,739 describes the synthesis of nitriles by the catalytic vapor-phase reaction of nitric oxide with alkyl-substituted organic compounds containing at least one alkyl, preferably methyl, group directly attached to a carbon atom which is, in turn, attached to another carbon atom by a double bond. For example, in one embodiment of the process of the aforesaid patent, acrylonitrile is prepared by the reaction of propylene and nitric oxide in the presence of a silver-on-silica catalyst. This invention provides an improvement in the basic process described in U.S. Patent 2,736,739.

When a chemical process is evaluated from the standpoint of feasibility of commercial-scale operation, consideration is given to the extent to which the starting materials are utilized in producing the desired products as well as to the operating conditions required to achieve such utilization, e.g., the reaction time and temperature required; the nature of the feed and process streams; and, based on the latter, the degree of separating and recycling required. Naturally, shorter reaction times, less-elevated temperatures, and a minimum of separating and recycling are desirable because of more economical and less troublesome operation. Thus, while in a catalytic process it obviously is desirable to employ a system in which the catalytic agent exhibits a high degree of activity and selectivity, i.e., is one which promotes the conversion of a high proportion of the reactants to the desired product, it is also desirable that good catalytic performance be achieved under economically acceptable operating conditions.

The activity and selectivity of a catalyst are judged from the conversion and yield obtained. As applied herein to a process wherein nitric oxide reacts with an alkyl-substituted organic compound containing unsaturation as described above, the term "conversion" means the number of moles of the desired nitrile obtained per mole of nitric oxide fed to the reactor; and the term "yield" denotes the number of moles of the desired nitrile obtained per mole of nitric oxide consumed in the reaction (i.e., nitric oxide fed to the reactor less unreacted nitric oxide). Thus, when all other conditions are equal, higher conversions (i.e., higher consumption of reactant) are indicative of catalysts having higher activity, and higher yields (i.e., less by-product formation) are indicative of catalysts having greater selectivity for the desired reaction.

The process described in the aforementioned patent, when applied to propylene, gives acrylonitrile in very low conversions. Certain catalysts have been found, e.g., the lead salt catalysts described in U.S. Patents 3,141,902 and 3,184,415, which give improved conversions to acrylonitrile in this process. However, while such catalysts give a marked improvement, they nevertheless may not afford as high an average conversion and/or yield as is desired; or, the operating conditions required to achieve satisfactory conversions and yields may not be the most satisfactory from the standpoint of economic operation. For example, in some systems, reaction temperatures above 500° C. are required. Secondly, it has heretofore been found necessary to employ an amount of propylene in the process which is greatly in excess of that theoretically required, a propylene-to-nitric oxide molar ratio of at least about 3 to 1 having been required for acceptable performance. Because of the high content of unreacted propylene in the off-gas, for economic reasons it is necessary that the propylene be recycled to the reactor. If the propylene employed contains any appreciable amount of inert gases, it is necessary to separate at least a portion of such gases from the propylene prior to recycle so as to avoid a build-up of inert diluents in the feed gas. Obviously, operation with a lower proportion of propylene relative to nitric oxide in the feed gas would be highly desirable.

Thus, in the described process, improvements in one or both of two major areas is desirable. Higher average conversions and/or yields are important regardless of whether or not operating conditions can be improved at the same time. On the other hand, a system which permits operating at lower unsaturated compound-to-nitric oxide molar ratios also is important regardless of whether or not conversions and yields are improved. Obviously, a system which effects an improvement in both of these areas as well as in other ways, e.g., by permitting operation at lower reaction temperature, is most desirable.

This invention provides an improvement in the process for making nitriles by the catalytic reaction of nitric oxide with organic compounds bearing a methyl group bonded to a carbon atom which, in turn, is bonded to another carbon atom by a double bond. As compared to known catalytic processes of this type, the improvement of this invention provides higher conversions and yields at low unsaturated compound to NO ratios and generally better performance under more economical operating conditions. The improved nitrilation reaction of this invention is particularly outstanding in providing the aforementioned desirable features while using catalysts obtainable from relatively inexpensive and readily available materials.

The improvement of this invention comprises using, in the reaction of nitric oxide and the aforementioned unsaturated compounds, a catalyst obtained by interacting at elevated temperature, that is, calcining, bismuth oxide and at least one of the group consisting of titanium, niobium, and phosphorus oxides, the atomic ratio of bismuth to phosphorus in said catalyst being greater than 1/1. Preferably, the catalyst also contains at least one nickel or alkaline-earth-metal oxygen-containing compound.

In the bismuth-containing catalyst used in the process of this invention, bismuth and chemically bound oxygen are held in a crystal lattice in a manner such that the oxygen has a restricted lability under the reaction conditions. "Lability" denotes here the ability of the combined oxygen to be converted to free oxygen in the process in which the catalyst is to be used. In the bismuth-containing catalyst, the lability of the oxygen is rectricted, but not hindered completely. "Restricted" denotes that the bound oxygen is released as free oxygen only at a very low rate, and, in particular, at a rate considerably lower than that at which oxygen is released from a 100% bismuth oxide composition or from a composition in which bismuth oxide is present solely in physical admixture, but higher than that from $BiPO_4$. Since elemental bismuth is an inactive component in the present process, and since release of oxygen is associated, either directly or indirectly, with the reduction of the bismuth present to elemental bismuth, the rate of oxygen release should be low in order to avoid the necessity of frequent replacement or renewal of the composition.

Suitable restriction of oxygen liability in a bismuth-containing composition for use in the present process is accomplished by preparing the composition by interaction, at elevated temperature, e.g., a temperature above about 450° C., of bismuth oxide, preferably trioxide, with one or more of titanium, niobium, and phosphorus oxides. Depending on the oxides used and the relative proportions thereof, one or more of several types of crystalline interaction products can be present in the catalysts employed in this invention. First, one or more compounds composed of a bismuth cation and an oxyanion of one of the foregoing elements, i.e., bismuth phosphate, niobate, and titanate can be present. Second, interaction can yield a catalyst which is a solid solution, e.g., a bismuth trioxide-niobium pentoxide solid solution. Finally, there also can be present bismuth oxide in a polymorphic modification doped with foreign ions derived from the other interacting oxide(s), that is a bismuth oxide phase containing ions including at least one of titanium, phosphorus, and niobium. As just indicated, more than one kind of interaction can have taken place. The lability of the oxygen in the resulting composition depends on the stability of the crystalline phases formed, as well as on the amount of free pure bismuth oxide present, if any, and on how it is distributed through the mass. In any case, the lability of the oxygen will be greatly restricted over that in 100% bismuth oxide, or in a physical mixture containing only non-interacted bismuth oxide, but greater than that in $BiPO_4$. Stated in another way, the bismuth oxide is interacted partially or completely with the aforementioned "restricting" oxides to form new crystalline phases, different from the bismuth oxide starting material as well as from physical mixtures of bismuth oxide and the aforementioned oxides.

While it is not intended that the present invention be limited by theoretical considerations, it is believed that in the present process the bismuth composition in the form described functions as a true catalyst and, to some degree, as a reactant. The catalytic function requires bismuth oxide in a stabilized form; reactive function requires labile oxygen. Thus, the composition should include an oxygen-containing bismuth compound in a form in which it can release its oxygen at a low rate, e.g., as bismuth oxygenated salts, bismuth oxide solid solutions, and bismuth oxide crystalline modifications containing one or more of titanium, niobium, and phosphorus. Free pure bismuth oxide can be present provided the amount is small enough, e.g., less than 50% by weight, and preferably less than 25%, and the distribution thereof is such that reduction to metallic bismuth at any significant rate is avoided. Free oxides of the above-mentioned oxyanion-forming elements also can be present in similar amounts. Although the bismuth-containing composition is assumed to react to some extent in addition to exhibiting truly catalytic behavior, for simplicity it is referred to herein as a "catalyst."

The nature of the crystalline phases present in the catalysts used in the process of this invention, and consequently the composition of the catalysts, can vary widely and depend on such factors as the particular interactants employed in their formation; the conditions used to prepare the catalyst, e.g., the time-temperature conditions used to bring about interactions; the relative amounts of interactants; etc. In all cases, however, these phases will include a bismuth oxygenated salt, a bismuth oxide solid solution, and/or bismuth oxide crystalline modifications containing foreign ions derived from one or more of the "restricting" oxides of titanium, phosphorus, and niobium. In addition, one or more "restricting" oxides as well as a small amount of free pure bismuth oxide can be present.

In a preferred form, the catalyst used in the process of this invention is one which contains, in addition to the bismuth and restricting oxide components, an oxygen-containing compound of at least one metal selected from the group consisting of nickel and the alkaline-earth metals, i.e., barium, calcium, strontium, and magnesium. Such optional nickel and alkaline-earth-metal compounds are generally present in the form of oxides or salts thereof with one or more of the other interactants. As will be seen from the following examples, modification of the catalyst in this manner affords means for obtaining satisfactory conversions and yields using more economical operating conditions, e.g., lower contact times and lower unsaturate-to-nitric oxide mole ratios.

As previously indicated, the catalysts used in this invention are prepared by the interaction at elevated temperature of bismuth oxide and at least one of titanium, phosphorus, and niobium oxides. As used herein, reference to the catalysts obtained by the interaction or calcining of the aforementioned "oxides" includes not only the products obtained by mixing and heating the oxides per se, but also the products obtained from compounds which decompose to the oxides at temperatures below those at which there is any substantial or gross fusion of the catalyst or components present during its preparation. The heat treatment is a calcining treatment, that is, heating without substantial fusion until there is phase modification, i.e., until a major portion, e.g., 50% or more, of the bismuth oxide reacts with, dissolves in, or occludes the other components as shown by X-ray analysis.

The range of calcining temperatures which can be employed to prepare the composition varies depending on the particular components which are to interact and on the kind of interaction. In addition, longer calcining times can permit lower temperatures to be used. In general, however, a temperature of at least about 450° C. will be employed, a preferred range being about from 700–800° C. The upper limit on calcining temperature will be dictated by the fusion temperature of the phases formed. As a rule, temperatures above about 1000° C. do not appear to be useful, particularly from the economic standpoint. Calcining time should be at least about 3 hours and preferably at least about 6 hours. Usually more than 20 hours calcining time is unnecessary.

Examples of materials, preferably in finely divided form, which can be heated to give the oxide interaction products employed as catalysts in accordance with this invention are bismuth trioxide and pentoxide; phosphorus trioxide, tetroxide and pentoxide; titanium dioxide, sesquioxide and peroxide; and niobium monoxide, dioxide, and pentoxide; as well as compounds which decompose to oxides at the calcination temperatures with the evolution of inert, and preferably volatile, by-products, including inorganic compounds such as nitrates, carbonates, bicarbonates, chlorides, ammonium salts, acids and hydroxides of bismuth, titanium, phosphorus, and niobium as well as organic compounds such as lactates, oxalates, and acetates. Specific examples of decomposable compounds are bismuth, nitrate, carbonate, citrate, and oxalate; hypo-, meta-, ortho-, and pyrophosphorous and -phosphoric acids and the corresponding ammonium phosphates and phosphites; titanium di-, tri-, and tetra-chlorides, oxalate, and lactate; niobic acid and niobium oxalate; and mixtures thereof.

Auxiliary modifying ions such as nickel and alkaline-earth modifiers can be introduced in the same manner as the basic oxide ingredients, i.e., as oxides or as one or more of the aforementioned decomposable derivatives thereof. Alternately, decomposable oxy-compounds of such auxiliary ingredients and the basic ingredients, for example, alkaline-earth hydrogen phosphates, can be used to introduce both basic and modifying elements.

The catalyst can be unsupported or it can be supported on a substrate. For use in unsupported form, the catalyst can conveniently be prepared by pelleting or extruding into masses of a desired size and shape. The calcination step can be performed either on the loose powder mixture or on the larger aggregates. If the calcination is performed on the powder, it generally is necessary to grind the calcined powder to a suitable granule size prior to aggregating it, e.g., by pelleting. In preparing the powder for pelleting, materials can be added thereto for such purposes as to facilitate agglomeration, provide the desired porosity, etc. For example, an aqueous solution of polyvinyl alcohol can be added to agglomerate the mixture. Such materials are burned out of the composition by heating, preferably at a gradual rate of temperature rise, generally to a temperature of about 300 to 600° C.

If desired, the bismuth composition can be extended on a support material, e.g., α-alumina, bauxite, pumice, kieselguhr, fuller's earth, silica gel, and other conventional supporting materials. In making such a supported catalyst, the support can be impregnated with the desired catalyst materials by any one of various techniques. For example, the support material can be agitated first in an aqueous solution of an oxygen-containing salt of bismuth, e.g., bismuth nitrate, and then a water-soluble phosphate, while the water is evaporated off.

As is seen from the examples, additives can be incorporated into the composition either before or after the calcination step. Thus in some cases the additive may undergo some interaction with other components during the preparation, while in others the additive may be present simply as a physically admixed component. In any case, the nickel and alkaline earth additives are usually present as oxides or as salts thereof with one or more of the basic oxide elements.

Catalytic performance is noticeably affected by the molar proportions of oxides used in the catalyst, optimum proportions differing with the particular oxides concerned. In all cases the proportions of oxides or other oxygen-containing compounds used should be such that the amount of free pure bismuth oxide is minor, i.e., less than 50% by weight. In most unmodified, binary oxide mixtures, bismuth oxide should be furnished in slight excess of that stoichiometrically required to react with the other oxide to form a salt, e.g., $BiPO_4$, $BiNbO_4$, and $Bi_4Ti_3O_{12}$, although in the case of titanium and niobium less than stoichiometric quantities still yield improved results. As is seen in Table I, a mixture of $Bi_2O_3$ and $P_2O_5$ in a 1/1 molar ratio such as to give $BiPO_4$ is ineffective.

The stoichiometric excess of bismuth oxide can vary widely (cf. Examples 3 and 4). However, since a large excess leads to hyperactivity and increases the possibility of forming agglomerates of bismuth metal during the reaction, it is prefered that the excess be about 5–100%. Thus, preferred compositions in the bismuth-phosphorus system have 1.05/1 to 2/1 atomic ratios of bismuth to phosphorus, although ratios as high as 6/1 have been used. In the bismuth-phosphorus-niobium system, the ratios of components are preferably such that the atomic ratio of bismuth to the total of phosphorus and niobium is at least 1/1 but less than 4/1. In the bismuth-titanium system the atomic ratio of bismuth to titanium is usually greater than 1.3/1 but less than 4/1, and preferably less than 2/1.

Examples of additives which can be employed are one or more oxides of nickel and of the alkaline-earth metals, or precursors of these oxides, e.g., nitrates and carbonates. Depending on the conditions used after incorporation of the additives, the oxygen-containing precursors can be reduced to the oxides, although this is not necessary. Obviously, the ingredients used should be such that no deleterious decomposition products, e.g., halides, can be produced during the catalyst preparation. When an oxygen-containing nickel compound is used as an additive in the bismuth composition, it is generally used in an amount sufficient to furnish about 0.1–1 mole of nickel oxide per mole of bismuth oxide or equivalent. More than 2 moles of nickel oxide per mole of bismuth oxide is not a preferred ratio (see Example No. 21). When an oxygen-containing alkaline-earth-metal compound is used, it generally is used in an amount of at least about 2% of the weight of the composition to which it is added. The optimum amount of alkaline-earth-metal oxide or equivalent to achieve the desired effect, e.g., reduction in contact time, varies with different compositions, but generally is up to about 10%. There usually is no significant added benefit to be gained by exceeding about 20% by weight.

In certain cases it is feasible to dilute the catalyst composition with certain metal oxides which by themselves do not form strongly catalytically active materials with bismuth oxide but which do not significantly impair the activity of the compositions described herein. Such oxides include, for example, stannic oxide, silica, alumina, and zirconia. This diluting procedure is particularly useful when the "restricting" oxides used are more expensive materials than the diluents.

The interaction of bismuth oxide with at least one of titanium, phosphorus, and niobium oxides as well as the aforementioned additives can be verified by X-ray diffraction techniques. These techniques have permitted the detection of the following crystalline phases in the bismuth compositions described in the examples: $\gamma^*$-$Bi_2O_3$, $BiPO_4$, $\delta^*$-$Bi_2O_3$ solid solution containing up to 23.5 mole percent $Nb_2O_5$, $5Bi_2O_3 \cdot 3Nb_2O_5$ (compound), $BiNbO_4$, nickel oxide, $Bi_4Ti_3O_{12}$ (compound), $TiO_2$, and α-$Bi_2O_3$. The $\gamma^*$-$Bi_2O_3$ and $\delta^*$-$Bi_2O_3$ phases are unstable phases of $Bi_2O_3$ stabilized by the presence of ions derived from the other constituents of the interaction mixture. The $\gamma^*$ and $\delta^*$ designation is according to that suggested by G. Gattow and H. Schröder, Z. anorg. u. allgem. Chem. 318, 176–89 (1962). Both low-temperature and high-temperature modifications of $BiPO_4$ and $BiNbO_4$ have been found.

As has been mentioned previously, the activity of the bismuth catalyst can be restored at suitable intervals by regeneration, e.g., by passing air, or air diluted with inert gas, through the composition.

The catalysts described above are used in accordance with this invention to catalyze the reaction of nitric oxide with a wide variety of compounds bearing methyl alpha to ethylenic or benzenoid unsaturation, that is, compounds having the active moiety

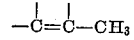

Examples of such compounds include aliphatic olefins, preferably olefinic hydrocarbons, such as propylene, isobutylene, 2-butene, isoprene, and 2-hexene; cycloaliphatic olefins such as 1-methylcyclohexene; and aromatics such as toluene, the xylenes, mesitylene, 2-chlorotoluene, 2-nitrotoluene, and methylnaphthalene; as well as heterocyclic compounds having ring unsaturation such as β-picoline, 2-methylthiophene, and 2-methylpyridine. Aliphatic monoölefinic hydrocarbons of 3 to 4 carbon atoms such as propylene and isobutylene, as well as toluene, the xylenes, and β-picoline, which yield, respectively, acrylonitrile, methacrylonitrile, benzonitrile, the phthalonitriles, and nicotinonitrile, are preferred. The reaction of propylene to give acrylonitrile is an especially preferred embodiment of this invention.

The nitrilation reaction is generally effected at temperatures within the range of about from 350° to 600° C. Below 350° C., the conversion drops; at temperatures higher than about 600° C., the effect of cracking of the unsaturated compound begins to be reflected in a marked drop in catalyst activity. Optimum results may be obtained at different temperatures with different bismuth catalyst systems, ranging from about 380° C. to about 550° C., such range therefore being preferred. If it is desired to operate at the lower end of the temperature range, a system favoring such operation will be employed, i.e., a system containing bismuth, phosphorus and/or niobium, and preferably also an alkaline-earth oxide or nickel oxide.

The present process can be carried out at atmospheric pressure, although slight superpressures, e.g., up to about 5 atmospheres, are generally preferred from the point of view of ease of feed-stream processing.

The composition of the feed stream can vary from about 0.5–10 moles of unsaturated compound per mole of nitric oxide, higher ratios favoring higher conversions in some instances. However, it generally is unnecessary to use an unsaturate-to-nitric oxide molar ratio of greater than 3/1. Moreover, in the present process, excellent results can be attained with molar ratios of less than 3/1, e.g., as low as 1/2. Since ratios below 3/1 reduce recycling problems, such ratios are preferred.

In addition to unsaturated compound and nitric oxide, the feed stream can contain inert gases such as the rare gases, e.g., argon, as well as nitrogen, water vapor, carbon dioxide, or a mixture of such gases. The nitric oxide used can be in the form of ammonia oxidation product gas consisting principally of nitrogen in addition to nitric oxide. The presence of saturated hydrocarbons, e.g., propane, is not deleterious in the present process. Generally, it is preferred to have the nitric oxide constitute about 9 to about 20 percent by volume of the feed gas; unsaturate less than three times the percent by volume of nitric oxide; and the remainder a diluent such as nitrogen.

The contact time is controlled by the feed rate and the catalyst bed volume, and generally is within the range of 0.1 to 10 seconds, preferably 0.8 to 8 seconds.

As seen from the following examples, nitriles are obtained in excellent conversions and yields by the present process while, at the same time, operating conditions can be employed which are more satisfactory from an economical standpoint than those which have been required heretofore. The examples also show that typical bismuth compositions maintain their effectiveness over extended periods (see Examples No. 7 and 15). Furthermore, the bismuth catalysts used in the process of this invention are made from relatively inexpensive and readily available materials. Moreover, while good performance is seen to be obtained with compositions based on the interaction of bismuth oxide with one or more oxides selected from the group consisting of phosphorus, niobium, and titanium oxides, the addition of modifiers or additives in the form of oxygen-containing compounds of nickel and of the alkaline-earth metals gives added benefit. Depending on the specific composition, the addition of one or more of these modifiers thereto may permit, for example, operation at lower contact times, and the use of lower temperatures, lower propylene/nitric oxide volume ratios, larger amounts of nitric oxide in the feed gas, etc.

The following examples serve to illustrate specific embodiments of the process of the present invention. The terms "conversion" and "yield" appearing in the examples have the connotation given previously, i.e., moles of nitrile obtained per mole of nitric oxide fed, and moles of nitrile obtained per mole of nitric oxide consumed, respectively. In addition, it should be understood that the conversions and yields given do not represent the highest attainable with a particular catalyst composition but only the conversions and yields attained under the particular set of conditions employed. In any particular case, altering the conditions, for example increasing the contact time, changing the temperature, and using a higher unsaturate to nitric oxide ratio in the feed, could have the effect of increasing the conversion and/or yield.

*Examples 1 to 8*

A number of catalyst based on bismuth trioxide and phosphorus pentoxide are prepared according to the following basic procedure:

Bismuth trioxide and a compound which gives phosphorus pentoxide upon heating, both in the form of powders and in amounts such as to provide a desired bismuth trioxide/phosphorus pentoxide molar ratio, are ground together in a ball mill in the presence of acetone for 15–30 minutes to a particle size such that the powder passes through a 325-mesh screen. When an additive is used, it is ground together with the bismuth trioxide and source of phosphorus pentoxide. The dry powder mixture then is calcined, reground in the ball mill as previously for 1 hour, and then pelleted by blending into it an aqueous solution of polyvinyl alcohol so as to form aggregates, removing excess liquid, and pressing into 3/16-inch pellets. Polyvinyl alcohol s removed by heating slowly up to a temperature of about 500° C. In some instances the pellets are conditioned by further heating at about 500° C. Details of the preparation and performance evaluation of the compositions as catalysts are summarized in Table I.

Catalyst performance is evaluated in the improvement of this invention by packing the pellets into a tubular reactor operating at the temperatures specified in the table, and passing a gaseous mixture of nitric oxide, propylene, and nitrogen through the catalyst bed at a pressure of 8 p.s.i.g. The contact time is controlled by the catalyst bed volume and feed rate of the gas mixture. The reactor is operated with each composition for a number of cycles, each generally varying in duration from about 0.5 to about 1.0 hour. Between cycles, air is passed through the catalyst bed, generally for a period of time equivalent to one-half a cycle length. The catalyst age reported in the table is the time the composition has been subjected to the nitrile synthesis conditions prior to the cycle reported. In the "Feed Composition" column, it is understood in all cases that the remainder of the gas mixture is nitrogen.

TABLE I

| Example | Catalyst Ingredients | | | Catalyst Preparation Conditions | | |
|---|---|---|---|---|---|---|
| | Source of $P_2O_5$ | $Bi_2O_3/P_2O_5$ Molar Ratio | Additive (Molar Ratio) | Calcination | | Heating after Pelleting |
| | | | | Temp. (° C.) | Time (hrs.) | |
| 1 | $(NH_4)_2HPO_4$ | 1.5/1 | | 700 | 10 | Slowly up to 500° C. (4 hrs.); 17 hrs. at 500° C. |
| 2 | $(NH_4)_2HPO_4$ | 2/1 | | 650 | 17 | Slowly up to 500° C. (3.75 hrs.). |
| 3 | $(NH_4)_3PO_4$ | 1.05/1 | | 800 | 12 | Slowly up to 500° C. (3.75 hrs.); 2 hrs. at 500° C. |
| 4 | $(NH_4)_2HPO_4$ | 6/1 | | After pelleting | | Slowly up to 500° C. (4 hrs.); 16 hrs. at 650° C. |
| 5 | $(NH_4)_2HPO_4$ | 1/1 | | After pelleting | | Slowly up to 500° C. (4 hrs.); 16 hrs. at 625° C. |
| 6 | $(NH_4)_2HPO_4$ | 2/1 | $NiCO_3(Bi_2O_3/NiO=2/1)$ | | | Same as Example 2 |
| 7 | $(NH_4)_2HPO_4$ | 1.5/1 | $NiCO_3(Bi_2O_3/NiO=1.5/1)$ | 650 | 10 | Slowly up to 500° C. (3 hrs.). |
| 8 | $(NH_4)_2HPO_4 BaHPO_4$ | 1.2/1 | $Bi_2O_3/BaO=3/1$ | 700 | 12.5 | Slowly up to 500° C. reground 60 min. under water; repelleted; heated slowly up to 500° C. |

TABLE I—Continued

| Example | Catalyst Performance | | | | | | | | |
|---|---|---|---|---|---|---|---|---|---|
| | Propylene-NO Reaction Conditions | | | | | | Conversion to ACRN[1] | | Yield of ACRN[1] (av.) |
| | Temp. (° C.) | Contact Time (sec.) | Feed Compn. (Vol. percent) | | Catalyst Age (hrs.) | Cycle Length (hrs.) | Av. | Peak | |
| | | | Propylene | NO | | | | | |
| 1 | 435 | 4 | 22.5 | 9 | 3.3 | 0.4 | 0.55 | 0.61 | 0.82 |
| 2 | 435 | 4 | 18 | 9 | 0.9 | 0.3 | 0.41 | 0.49 | 0.89 |
|   | 440 | 4 | 13.5 | 9 | 1.3 | 0.6 | 0.46 | 0.49 | 0.83 |
|   | 460 | 3 | 9 | 9 | 3 | 0.9 | 0.45 | 0.53 | 0.92 |
|   | 455 | 3 | 12 | 12 | 5 | 0.9 | 0.42 | 0.49 | 0.92 |
| 3 | 450 | 2 | 24 | 12 | 1.8 | 0.5 | 0.39 | 0.53 | 0.91 |
| 4 | 440 | 3 | 18 | 9 | 2 | 0.9 | 0.36 | 0.37 | 0.83 |
| 5 | 380–480 | 5 | 18 | 9 | | | None | | |
| 6 | 435 | 3 | 18 | 9 | 1 | 0.6 | 0.43 | 0.46 | 0.88 |
| 7 | 420 | 8 | 13.5 | 9 | 6 | 0.6 | 0.46 | | |
|   | 430 | 8.2 | 18 | 9 | 69 | 0.6 | 0.43 | | 0.50 |
|   | 435 | 6 | 18 | 9 | 107 | 0.7 | 0.43 | | 0.53 |
| 8 | 475 | 5 | 24 | 12 | 3 | 0.25 | 0.53 | 0.58 | 0.99 |

[1] ACRN=acrylonitrile.

Substitution of isobutylene, 2-butene, toluene, the xylenes, and β-picoline for propylene in comparable molar quantities relative to nitric oxide in Examples 1–8 similarly results in the formation of the respective nitriles.

*Examples 9 to 23*

A number of compositions based on bismuth trioxide and niobium pentoxide, or on bismuth trioxide, niobium pentoxide, and phosphorus pentoxide are prepared by the procedure described in Examples 1 to 8 and are evaluated as described therein. In this case the powders ground are bismuth trioxide, niobium pentoxide, and in some cases a source of phosphorus pentoxide and/or additives. Details of the preparation and performance evaluation of these compositions as catalysts are summarized in Table II.

TABLE II

| Example | Catalyst Ingredients | | | Catalyst Preparation Conditions | | |
|---|---|---|---|---|---|---|
| | Source of P₂O₅ | Bi₂O₃/Nb₂O₅ or Bi₂O₃ Nb₂O₅/P₂O₅ Molar Ratio | Additive (Molar Ratio) | Calcination | | Heating after Pelleting |
| | | | | Temp. (° C.) | Time (hrs.) | |
| 9 | | 1.66/1 | | 800 | 10 | Slowly up to 500° C. |
| 10 | Catalyst of Ex. 9 after 5 hrs.' use, reground with 1% (by wt.) BaHPO₄ and repelleted. | | | | | |
| 11 [2] | | 1/1 | NiCO₃(Bi₂O₃/NiO/=1/1) | 600 | 10 | Slowly up to 500° C. |
| 12 | (NH₄)₂HPO₄ | 2/1/1 | NiCO₃(Bi₂O₃/NiO/=1/1) | 650 | 10 | Slowly up to 500° C. (3 hrs.). |
| 13 | (NH₄)₂HPO₄ | 2/1/1 | NiCO₃(Bi₂O₃/NiO/=1/1) | 675 | 10 | Calcined after pelleting. |
| 14 | Same as Example 13 | | | 715 | 10 | Calcined after pelleting. |
| 15 | Catalyst of Ex. 13, after 8 hrs.' use, and catalyst of Ex. 14 after 4.6 hrs.' use, ground together under acetone, pelleted, heated slowly up to 450° C. and heated at 350° C. for 12 hrs. | | | | | |
| 16 | (NH₄)₂HPO₄ | 2/1/1 | NiCO₃(Bi₂O₃/NiO/=1/1) | 675 | 16 | Slowly up to 525° C. (4 hrs.); 4 hrs. at 500° C. |
| 17 | (NH₄)₂HPO₄BaHPO₄ | 2/1/1 | NiCO₃(Bi₂O₃/NiO/BaO=1/1/0.67) | Same as Example 16 | | |
| 18 | (NH₄)₂HPO₄CaHPO₄ | 2/1/1 | NiCO₃(Bi₂O₃/NiO/CaO=1/1/0.67) | Same as Example 16 | | |
| 19 | Catalyst of Ex. 17, after 8 hrs.' use, and catalyst of Ex. 18, after 8.4 hrs.' use, in 50/50 wt. mixt., ground together, pelleted, and heated. | | | | | |
| 20 | BaHPO₄ | 2/1/1.5 | NiCO₃(Bi₂O₃/NiO/BaO=1/1/1.5) | 700 | 10 | Slowly up to 500° C. (4 hrs.); 4 hrs. at 500° C. |
| 21 | BaHPO₄ | 2/1/1.5 | NiCO₃(Bi₂O₃/NiO/BaO=1/2/1.5) | Same as Example 20 | | |
| 22 | (NH₄)₂HPO₄ | 3/1/1 | NiCO₃(Bi₂O₃/NiO/6/1) | 700 | 16 | Slowly up to 500° C.; 4 hrs. at 500° C.; 2 hrs. at 700° C. |
| 23 | (NH₄)₂HPO₄BaHPO₄ | 3/0.5/1 | Bi₂O/BaO=3/1 | 700 | 16 | Calcined after pelleting. |

TABLE II—Continued

| Example | Propylene-NO Reaction Conditions | | | | | | Conv. to ACRN [1] | | Av. Yield of ACRN [1] |
|---|---|---|---|---|---|---|---|---|---|
| | Temp. (°C.) | Contact Time (sec.) | Feed Compn. (Vol. Percent) | | Catalyst Age (hrs.) | Cycle Length (hrs.) | Av. | Peak | |
| | | | Propylene | NO | | | | | |
| 9 | 450 | 2.5 | 18 | 9 | 1.7 | 0.9 | 0.39 | 0.43 | 0.68 |
| 10 | 440 | 5 | 18 | 9 | 3.5 | 0.5 | 0.45 | 0.47 | 0.69 |
| 11 [2] | 470 | 3 | 13.5 | 9 | 3.8 | 0.4 | 0.37 | 0.43 | 0.67 |
| 12 | 415 | 8 | 18 | 9 | 3.3 | 0.66 | 0.50 | 0.55 | 0.73 |
| | 420 | 8 | 13.5 | 9 | 4.6 | 0.66 | 0.53 | 0.56 | 0.73 |
| 13 | 435 | 6 | 13.5 | 9 | 4.3 | 0.75 | 0.49 | 0.52 | 0.85 |
| 14 | 445 | 5 | 13.5 | 9 | 2.0 | 0.66 | 0.43 | 0.49 | 0.91 |
| 15 | 435 | 4 | 13.5 | 9 | 4.0 | 1 | 0.53 | 0.61 | 0.87 |
| | 440 | 4 | 13.5 | 9 | 46 | 0.5 | 0.43 | | 0.60 |
| | 440 | 4 | 13.5 | 9 | 164 | 0.5 | 0.45 | | 0.60 |
| 16 | 420 | 4 | 18 | 9 | 1.0 | 0.66 | 0.42 | 0.49 | 0.66 |
| | 420 | 3 | 18 | 9 | 1.8 | 0.66 | 0.37 | 0.45 | 0.69 |
| 17 | 445 | 4 | 18 | 9 | 7.2 | 0.85 | 0.49 | 0.53 | 0.83 |
| | 445 | 3 | 18 | 9 | 5.0 | 0.88 | 0.47 | 0.50 | 0.93 |
| 18 | 445 | 4 | 18 | 9 | 7.7 | 0.75 | 0.49 | 0.52 | 0.87 |
| | 445 | 3 | 18 | 9 | 5.4 | 0.75 | 0.45 | 0.47 | 0.93 |
| 19 | 445 | 2.5 | 18 | 9 | 1.8 | 0.66 | 0.50 | 0.55 | 0.82 |
| | 445 | 2 | 18 | 9 | 4.4 | 0.75 | 0.45 | 0.51 | 0.71 |
| | 455 | 2 | 13.5 | 9 | 3.5 | 1 | 0.45 | 0.50 | 0.76 |
| 20 | 465 | 3 | 18 | 9 | 1.5 | 0.75 | 0.38 | 0.42 | 0.61 |
| 21 | 465 | 3 | 18 | 9 | 1.5 | 0.75 | 0.31 | 0.33 | 0.51 |
| 22 | 455 | 2 | 18 | 12 | 4.5 | 0.92 | 0.45 | 0.50 | 0.73 |
| | 485 | 1 | 12 | 12 | | | 0.36 | 0.44 | 0.75 |
| 23 | 515 | 2 | 30 | 12 | 10.9 | 0.75 | 0.33 | 0.41 | 0.79 |

[1] ACRN=acrylonitrile.  [2] Catalyst of Example 11 supported on α-alumina.

Substitution of isobutylene, 2-butene, toluene, the xylenes, and β-picoline for propylene in comparable molar quantities relative to nitric oxide in Examples 9–23 similarly results in the formation of the respective nitriles.

*Examples 24 to 30*

The following table presents a summary of the preparation and evaluation of a number of compositions based on bismuth trioxide and titanium dioxide. Each composition is prepared by calcining a finely ground mixture of the oxides at the indicated conditions, grinding the resulting product in a ball mill under water for 1–3 hours, and then drying it. The dried product next is pelleted as described in Examples 1 to 8, and then the polyvinyl alcohol burned out slowly by heating up to a temperature of 500° C. over a period of 2–3 hours.

TABLE III

| Ex. | Catalyst Preparation | | | Catalyst Performance | | | | | | Conv. to ACRN [1] | | Av. Yield of ACRN [1] |
|---|---|---|---|---|---|---|---|---|---|---|---|---|
| | Oxides (Molar Ratio) | Calcination | | Propylene-NO Reaction Conditions | | | | | | | | |
| | | Temp. (°C.) | Time (hrs.) | Temp. (°C.) | Contact Time (sec.) | Feed Compn. (Vol. Percent) | | Catalyst Age (hrs.) | Cycle Length (hrs.) | Av. | Peak | |
| | | | | | | Propylene | NO | | | | | |
| 24 | Bi$_2$O$_3$/TiO$_2$(0.83/1) | 800 | 17 | 490 | 2 | 24 | 12 | 0 | 0.75 | 0.54 | 0.57 | 0.76 |
| 25 | Bi$_2$O$_3$/TiO$_2$(0.75/1) | 800 | 17 | 490 | 2 | 24 | 12 | 1.25 | 1 | 0.46 | 0.53 | 0.78 |
| 26 | Bi$_2$O$_3$/TiO$_2$(0.68/1) | 800 | 17 | 490 | 2 | 24 | 12 | 1.1 | 0.9 | 0.41 | 0.54 | 0.68 |
| 27 | Bi$_2$O$_3$/TiO$_2$(0.66/1) | 800 | 12 | 500 | 2 | 24 | 12 | 1 | 1.25 | 0.37 | 0.44 | 0.77 |
| 28 | Bi$_2$O$_3$/TiO$_2$(0.5/1) | 800 | 12 | 500 | 2 | 24 | 12 | 0.9 | 1 | 0.39 | 0.47 | 0.54 |
| 29 | Bi$_2$O$_3$/TiO$_2$(1/1) | 800 | 12 | 500 | 2 | 24 | 12 | 2.6 | 0.8 | 0.33 | 0.41 | 0.50 |
| 30 | Bi$_2$O$_3$/TiO$_2$/P$_2$O$_5$(1.5/1/0.5) P$_2$O$_5$ source: (NH$_4$)$_2$HPO$_4$ | 500 | 15.5 | 435 | 4 | 24 | 12 | 1 | 0.66 | 0.39 | 0.49 | 0.82 |
| | | | | 420 | 3 | 30 | 12 | 3.66 | 0.8 | 0.39 | 0.45 | 0.83 |

[1] ACRN=acrylonitrile.

Substitution of isobutylene, 2-butene, toluene, the xylenes, and β-picoline for propylene in comparable molar quantities relative to nitric oxide in Examples 24–30 similarly results in the formation of the respective nitriles.

I claim:

1. In the process for the preparation of unsaturated nitriles by the catalytic reaction of nitric oxide with unsaturated organic compounds bearing a methyl group bonded to a carbon atom which, in turn, is bonded to another carbon atom by a double bond at a temperature of about 350° C. to 600° C., the improvement which comprises using a catalyst consisting essentially of a catalyst obtained by calcining at a temperature of about 450° C. to 1000° C. bismuth oxide with at least one of titanium oxides, niobium oxides or phosphorus oxides, the atomic ratio of bismuth to phosphorus in said catalyst being greater than 1/1, said catalyst containing less than about 50% by weight of free pure bismuth oxide.

2. A process of claim 1 wherein said catalyst is the product of the calcination of oxides of bismuth and oxides of phosphorus.

3. A process of claim 1 wherein said catalyst is the product of the calcination of oxides of bismuth and oxides of titanium.

4. A process of claim 1 wherein said catalyst is the product of the calcination of oxides of bismuth and oxides of niobium.

5. A process of claim 1 wherein said catalyst additionally contains at least one oxygen-containing compound of at least one of nickel or alkaline-earth metals.

6. In the process for preparing acrylonitrile which comprises catalytically reacting nitric oxide with propylene at a temperature of about from 350 to 600° C., the improvement which comprises using a catalyst obtained by calcining at a temperature of about 450 to 1000° C. bismuth oxide and at least one of titanium oxides, phosphorus oxides or niobium oxides, the atomic ratio of bismuth to phosphorus in said catalyst being greater than 1/1, said catalyst containing less than about 50% by weight of free pure bismuth oxide.

7. A process of claim 6 wherein said catalyst is the product of the calcination of bismuth trioxide and titanium dioxide, the atomic ratio of bismuth to titanium being about from 1.3/1 to 4/1.

8. A process of claim 6 wherein said catalyst is the product of the calcination of bismuth trioxide and niobium pentoxide.

9. A process of claim 6 wherein said catalyst is the product of the calcination of bismuth trioxide, phosphorus pentoxide, and niobium pentoxide, the atomic ratio of bismuth to the total of phosphorus and niobium being about from 1/1 to 4/1.

10. A process of claim 6 wherein said catalyst is the product of the calcination of bismuth trioxide and phosphorus pentoxide, the atomic ratio of bismuth to phosphorus being about from 1.05/1 to 2/1.

11. A process of claim 10 wherein said catalyst is obtained by mixing bismuth trioxide with an ammonium phosphate and heating the resulting mixture at about from 700 to 800° C., the atomic ratio of bismuth to phosphorus being about from 1.05/1 to 2/1.

12. A process of claim 11 wherein about from 0.1 to 1 mole of nickel carbonate per mole of bismuth trioxide is calcined with said other ingredients for said catalyst.

13. A process of claim 11 wherein said catalyst is obtained by mixing bismuth trioxide and an alkaline earth metal phosphate, and heating the resulting mixture at about from 700 to 800° C., the atomic ratio of bismuth to phosphorus being about from 1.05/1 to 2/1.

References Cited

UNITED STATES PATENTS

| | | | |
|---|---|---|---|
| 3,125,538 | 3/1964 | Arnold et al. | 260—465.3 X |
| 3,157,688 | 11/1964 | Arnold et al. | 260—465.3 |
| 3,184,415 | 5/1965 | Huntley et al. | 260—465.3 X |

JOSEPH P. BRUST, *Primary Examiner.*